(12) United States Patent
Terashima et al.

(10) Patent No.: US 6,511,365 B2
(45) Date of Patent: Jan. 28, 2003

(54) LAPPING MACHINE

(75) Inventors: Shigeo Terashima, Kawasaki (JP); Hiroyuki Miyazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/459,036

(22) Filed: Dec. 10, 1999

(65) Prior Publication Data

US 2001/0044267 A1 Nov. 22, 2001

(30) Foreign Application Priority Data

May 28, 1999 (JP) .......................................... 11-149003

(51) Int. Cl.⁷ ................................................. B24B 1/00
(52) U.S. Cl. ............................ 451/58; 451/60; 451/21; 451/285; 451/290; 451/443; 451/444
(58) Field of Search ........................... 451/56, 72, 285, 451/286, 290, 443, 444, 262, 58, 41, 57, 53, 7, 21; 438/697, 693; 216/88, 89

(56) References Cited

U.S. PATENT DOCUMENTS

| | | | | |
|---|---|---|---|---|
| 5,081,051 A | * | 1/1992 | Mattingly et al. | 451/56 |
| 5,384,986 A | * | 1/1995 | Hirose et al. | 451/444 |
| 5,676,587 A | * | 10/1997 | Landers et al. | 451/57 |
| 5,775,983 A | * | 7/1998 | Shendon et al. | 451/444 |
| 5,779,526 A | * | 7/1998 | Gill | 451/324 |
| 5,857,898 A | * | 1/1999 | Hiyama et al. | 451/56 |
| 5,885,147 A | * | 3/1999 | Kreager et al. | 451/443 |
| 5,913,712 A | * | 6/1999 | Molinar | 451/41 |
| 5,938,507 A | * | 8/1999 | Ko et al. | 451/66 |
| 5,957,750 A | * | 9/1999 | Brunelli | 451/7 |
| 6,000,997 A | * | 12/1999 | Kao et al. | 451/7 |
| 6,062,952 A | * | 5/2000 | Robinson et al. | 451/41 |
| 6,074,283 A | * | 6/2000 | Maeda et al. | 451/53 |
| 6,095,898 A | * | 8/2000 | Hennhofer et al. | 451/7 |
| 6,196,897 B1 | * | 3/2001 | Suto et al. | 451/8 |

FOREIGN PATENT DOCUMENTS

JP          10286766          10/1998

OTHER PUBLICATIONS

US 5,985,755, 11/1999, Bajaj et al. (withdrawn)*

* cited by examiner

*Primary Examiner*—George Nguyen
(74) *Attorney, Agent, or Firm*—Greer, Burns & Crain, Ltd.

(57) ABSTRACT

An object of the present invention is to provide a lapping machine in which abrasive grains can be efficiently and completely removed from a lapping plate. In the lapping machine of the present invention, a lapping plate has a lapping face and rotates about a rotary shaft. A moving member has a wiping face extended in a longitudinal and moves, in a plane parallel to the lapping face of the lapping plate, in the direction perpendicular to the wiping face. A driving mechanism moves the moving member. With this structure, the moving member securely catches and removes foreign substances from the lapping plate. The foreign substances left can be completely removed in a short time and the working efficiency of the lapping steps can be highly improved.

19 Claims, 2 Drawing Sheets

LAPPING MACHINE

BACKGROUND OF THE INVENTION

The present invention relates to a lapping machine, more precisely relates to a lapping machine in which a work piece is lapped, in a plurality of lapping steps, with a plurality of kinds of abrasive grains.

In manufacturing steps of an MR head of a magnetic disk drive unit, a work piece is lapped so as to have a prescribed electric resistance. Conventionally, the work piece is lapped with one kind of abrasive grains. These days, compact and high density MR heads are required, and high lapping accuracy, e.g., 20–30 nm, is required. Thus, a plurality of lapping steps, i.e., a first (rough) lapping step to a final (finish) lapping step, are executed.

In the manufacturing steps of the MR head, the work piece is lapped in three lapping steps: the first lapping step, an intermediate lapping steps and the final lapping step. A problem of the lapping steps is abrasive grains left on a lapping plate. A grain size of the abrasive grains in each lapping step is different. Namely, the grain size is changed from large grains to fine grains in order. If the abrasive grains of a former lapping step are left on the lapping plate, the work piece will be scratched or damaged in the next lapping step. As described above, the high lapping accuracy is required, so the problem of the abrasive grains left on the lapping plate cannot be ignored. Therefore, the abrasive grains of the former lapping step must be completely removed from the lapping plate.

Conventionally, the abrasive grains are washed off, from the lapping plate, with a large amount of water. The abrasive grains left on the lapping plate can be washed off, but it takes a long time to completely wash the lapping plate. Working efficiency is important for manufacturing the MR heads. The working efficiency of the conventional lapping machine cannot be higher. Further, it is difficult to perfectly remove the abrasive grains by water.

Note that, in some cases, a correction ring is attached to a lapping face of the lapping plate. The correction ring makes the lapping face flat. The correction ring removes the abrasive grains but cannot remove them completely.

SUMMARY OF THE INVENTION

An object of the present invention is to provide a lapping machine in which abrasive grains can be efficiently and perfectly removed from a lapping plate.

To achieve the object, the lapping machine of the present invention comprises: a lapping plate having a lapping face, the lapping plate rotating about a rotary shaft; a moving member having a wiping face extended in a longitudinal direction, the moving member moving, in a plane parallel to the lapping face of the lapping plate, in the direction perpendicular to the wiping face; and a driving mechanism for moving the moving member.

In the lapping machine of the present invention, the moving member securely catches and removes foreign substances, including abrasive grains, left on the lapping plate. In comparison with the manner of washing the lapping face with water, the foreign substances, including the abrasive grains, left can be perfectly removed in a short time and the working efficiency of the lapping steps can be highly improved. By improving the working efficiency, manufacturing cost can be reduced.

In the lapping machine, the moving member may be connected to a supporting shaft and capable of turning about the supporting shaft. With this structure, the moving member is capable of moving on the lapping plate with a circular track.

In the lapping machine, the supporting shaft may be located outside of an outer edge of the lapping plate. With this structure, the whole lapping face can be wiped and the foreign substances including the abrasive grains can be perfectly removed therefrom.

The lapping machine may further comprise a control mechanism for adjusting a pressing force which presses the moving member onto the lapping plate. With this structure, foreign substances including the abrasive grains can be securely removed.

The lapping machine may further comprise an adjusting mechanism for adjusting an angle between the moving member and the lapping face of the lapping plate. With this structure, foreign substances including the abrasive grains can be securely removed.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Preferred embodiments of the present invention will now be described in detail with reference to the accompanying drawings.

Figure 1:
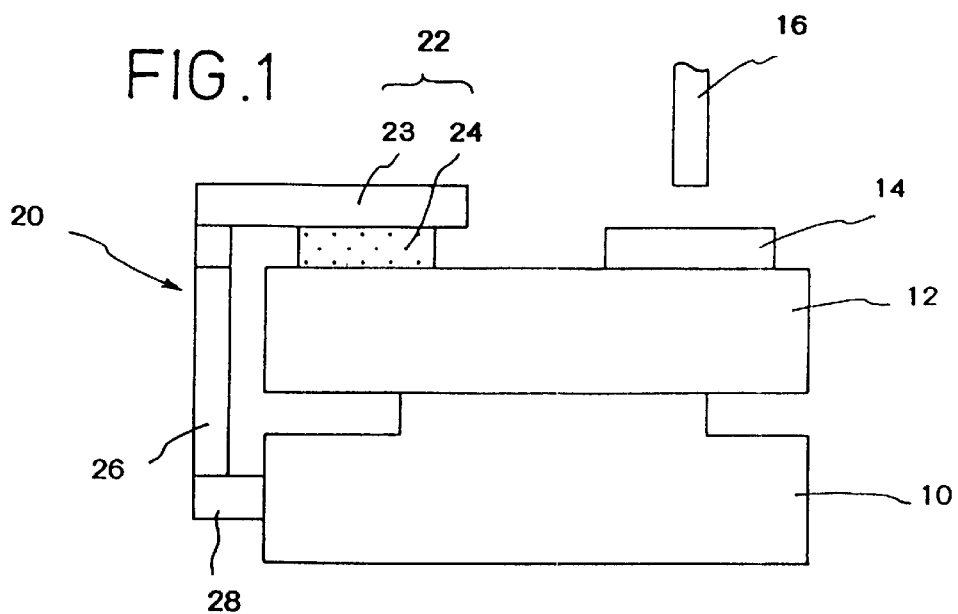
FIG. 1 is an explanation view of a lapping machine of an embodiment of the present invention.

FIG. 1 shows a summarized structure of the lapping machine of the present embodiment.

The lapping machine has a base 10. A lapping plate 12 is attached to the base 10. A work piece 14 is set on the lapping plate 12. The work piece 14 is pressed onto the lapping plate 12. Slurry including abrasive grains is supplied onto the lapping plate 12 from a slurry supplier 16 so as to lap the work piece 14.

In the lapping machine for manufacturing MR heads, minute electric current is passed through the work piece 14 when the work piece 14 is lapped. Amount of lapping the work piece 14 is controlled with detecting electric resistance of the work piece 14. To precisely control the amount of lapping the work piece 14, the abrasive grains whose grain size is $2 \mu m$ are used in the first lapping step; the abrasive grains whose grain size is $1 \mu m$ are used in the intermediate lapping step; the abrasive grains whose grain size is 0.18–0.2 $\mu m$ are used in the final lapping step.

When the lapping step is changed, the slurry and the abrasive grains left on the lapping plate 12 are removed by a removing mechanism 20.

In the lapping machine of the present embodiment, firstly the slurry and the abrasive grains left on the lapping plate 12 are washed off by water when the lapping step is changed. By employing the removing mechanism 20, the slurry, the abrasive grains and grain carrier included in the slurry, e.g., amine, glycerin, can be compulsorily removed from a lapping face (an upper face) of the lapping plate 12. The removing mechanism 20 is a feature of the lapping machine of the present embodiment.

The removing mechanism 20 comprises: a wiper 22, which is an example of the moving member and which is located above the lapping plate 12; a driving mechanism 26 for moving the wiper 22 on the lapping face of the lapping plate 12 with a circular track; and an angle adjusting mechanism for always holding the wiper 22 in a plain parallel to the lapping face of the lapping plate 12.

The wiper 22 includes a wiper arm 23, which is extended to a position above the lapping plate 12, and a wiping member 24, which is fixed to the wiper arm 23. The wiper 22 is moved on the lapping face of the lapping plate 12 rotating with the circular track so as to compulsorily remove foreign substances, e.g., the abrasive grains therefrom. Sizes of the wiper arm 23 and the wiping member 24 are designed to wipe the whole lapping face rotating.

A bottom face of the wiping member 24 contacts the lapping face of the lapping plate 12 so as to brush the lapping face and compulsorily remove the abrasive grains, etc. therefrom. Side faces of the wiping member 24 are wiping faces for pushing the foreign substances to remove. The wiping member 24 is made of many materials, e.g., cotton, sponge, rubber, plastics, and may be formed like a brush.

Figure 2:
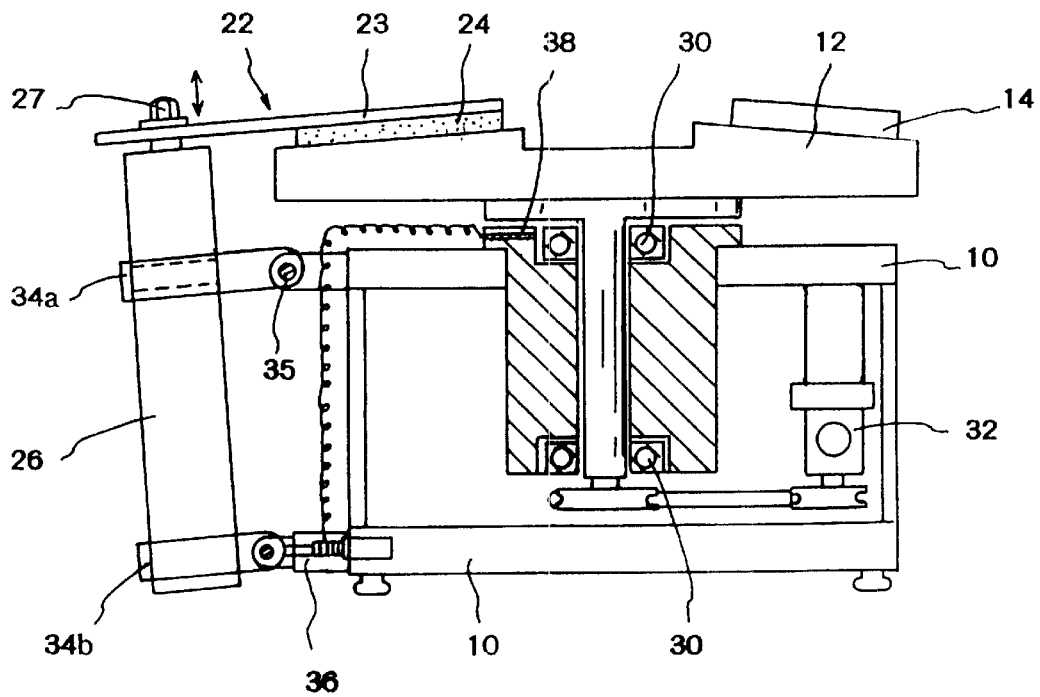
FIG. 2 is an explanation view of an inner structure of the lapping machine of the embodiment.

A detailed structure of the lapping machine of the present embodiment is shown in FIG. 2.

The lapping plate 12 is rotatably supported by the base 10 with a bearing 30. A motor 32 rotates the lapping plate 12. The motor 32 is fixed to the base 10 and transmits its power to the lapping plate 12 via a belt and pulleys.

The driving mechanism 26, which moves the wiper 22, is inclinably held at a side portion of the base 10. The driving mechanism 26 of the present embodiment is a robot cylinder unit. A rod 27 is extended from and retracted into the robot cylinder unit 26. Further, the rod 27 is rotated about its own axis. One end of the wiper arm 23 is fixed to the rod 27. With this structure, the wiper arm 23 can be moved close to and away from the lapping face of the lapping plate 12 and can be turned there above.

As described above, the robot cylinder unit 26 is held at the side porting of the base 10 by supporting arms 34a and 34b. The supporting arm 34a is pivotably attached to an upper part of the base 10 to support an upper part of the robot cylinder unit 26; the supporting arm 34b is pivotably attached to a lower part of the base 10 with an actuator 36 to support a lower part the robot cylinder unit 26. The actuator 36 moves the supporting arm 34b close to and away from a side face of the base 10. Because the robot cylinder unit 26 is pivotably attached to the base 10 by the supporting arm 34a, the supporting arm 34a is turned about a shaft 35 and the robot cylinder unit 26 is inclined when the actuator 36 moves the supporting arm 34b.

While the lapping plate 12 is rotated to lap the work piece 14, temperature of the lapping plate 12 rises due to friction, so that the lapping face is slightly deformed and location of the lapping face is slightly displaced. The actuator 36 adjusts a position or posture of the wiper 22 according to the displacement of the lapping face caused by the thermal deformation. The relationship between rising temperature of the lapping plate 12 and the displacement of the lapping face is previously known by experiment. The actuator 36 inclines the robot cylinder unit 26 according to the temperature of the lapping plate 12, so that the wiper 22, which contacts the lapping face of the lapping plate 12, can be maintained parallel to the lapping face of the lapping plate 12.

In the present embodiment, a thermos-sensor 38 is provided in the vicinity of the bearing 30, which supports the lapping plate 12, so as to detect the temperature of the lapping plate 12. The temperature raises most in the vicinity of the bearing 30. The actuator 36 is driven on the basis of data sent from the thermos-sensor 38. Note that, a bimetal may be employed as the thermos-sensor 38, and a piezo element may be employed as the actuator 36. In this case, the piezo element may be driven, so as to control the posture of the wiper 22, by a bimetal amplifier. The actual deformation of the lapping plate 12, which is caused by the frictional heat, is minute, so the piezo actuator can sufficiently control the posture of the wiper 22.

In the present embodiment, the angle adjusting mechanism 28 for adjusting the angle of posture of the wiper 22 includes: the mechanism for inclinably attaching the robot cylinder unit 26 to the base 10; the actuator 36 for inclining the robot cylinder unit 26; and the thermos-sensor 38 for controlling the actuator 36.

When the lapping step is changed, the removing mechanism 20 is driven to compulsorily remove the foreign substances, e.g., the slurry, the abrasive grains, from the lapping face of the lapping plate 12.

In the present embodiment, the foreign substances on the lapping plate 12 are washed off by water and removed by the on removing mechanism 20. Especially, by employing the removing mechanism 20, the wiper 22 can efficiently compulsorily remove the foreign substances from the lapping face of the lapping plate 12.

Even if the lapping face is displaced by rising temperature of the lapping plate 12, the angle adjusting mechanism 28 maintains the wiper 22 parallel to the lapping face and the wiper 22 securely contacts the lapping face, so that the wiping member 24 securely wipes the lapping face and perfectly removes the foreign substances therefrom.

The driving mechanism 26 turns the wiper 22 about the rod 27 so as to move the wiping member 24, in a fan-shaped area, on the lapping plate 12 rotating. By the movement of the wiping member 24, the foreign substances can be removed from the lapping plate 12.

The rotational axis of the wiper 22 is located outside of the lapping plate 12. With this structure, the whole lapping face can be wiped. If the rotational axis of the wiper 22 is located in the lapping plate 12, the foreign substances near the rotational axis is moved round the axis and cannot be removed.

The driving mechanism 26 adjusts the position or a wiping area of the wiper 22 and adjusts a pressing force, which presses the wiper 22 onto the lapping face of the lapping plate 12, by adjusting a projected length of the rod 27. The pressing force can be adjusted according to, for example, a material of the wiping member 24.

The foreign substances are washed off by water and compulsorily removed by the removing mechanism 20, the foreign substances can be efficiently and perfectly removed from the lapping plate 12. Therefore, the lapping steps can be easily and efficiently changed.

Figure 3A:
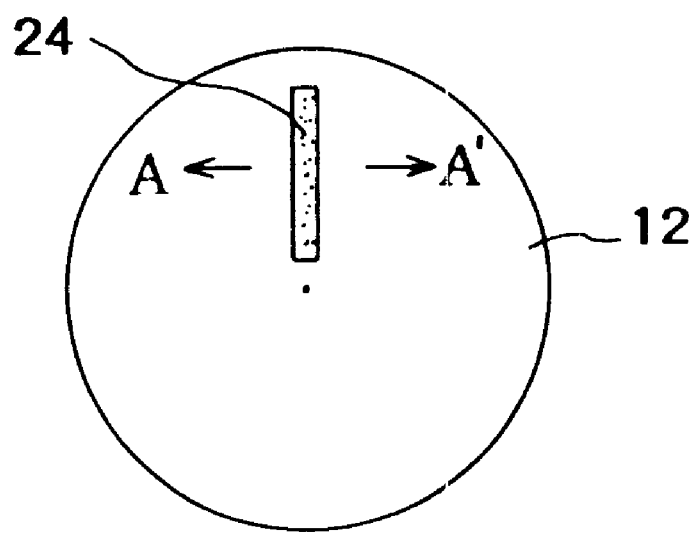
FIGS. 3A and 3B are plan views of a lapping plate of another embodiment of the lapping machine of the present invention.
Figure 3B:
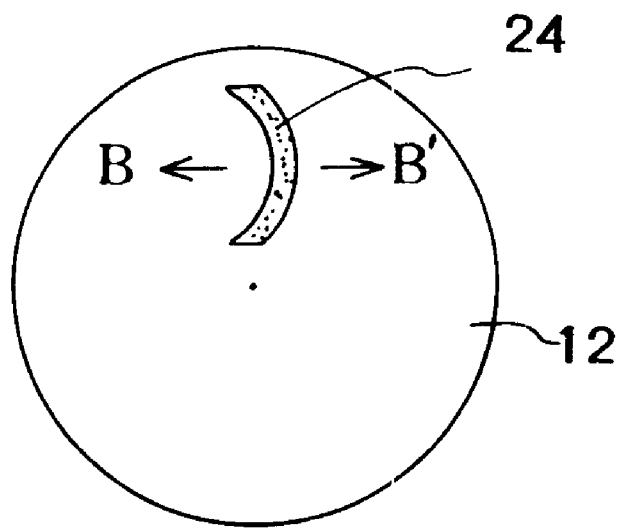

The mechanism of removing the foreign substances is not limited to the wiper 22, which is turned about the rotational axis. Another embodiment is shown in FIGS. 3A and 3B. The wiper 22 may be moved linearly as shown in FIGS. 3A and 3B. In FIG. 3A, a linear-shaped wiping member 24 is reciprocally moved in the direction A—A'. In FIG. 3B, a curved wiping member 24 is linearly reciprocally moved in the direction B—B'.

In the present embodiments, the lapping machine has the mechanism for correcting the thermal deformation of the lapping plate 12, so the work piece 14 can be highly precisely lapped with very fine abrasive grains. The lapping machine automatically laps the work piece 14 with detecting amount of lapping, and the thermal deformation of the lapping plate 12 can be automatically corrected. With these functions, the lapping machine capable of automatically changing the lapping steps can be realized.

In the above described embodiments, the lapping machine laps the work piece of the MR head. But the work piece is not limited to the MR head. The present invention may be applied to many types of lapping machines, in which a plurality of the lapping steps are executed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for lapping a work piece in a lapping machine having a lapping plate with a lapping face and a grain removing mechanism for removing abrasive grains from said lapping plate, said grain removing mechanism including a moving member which has a wiping face extended in a longitudinal direction and which moves, in a plane parallel to the lapping face, in the direction perpendicular to the wiping face so as to remove the abrasive grains, said method comprising the steps of:

setting a work piece in position upon the lapping plate;

supplying first abrasive grains to said lapping plate and lapping the work piece with the first abrasive grains;

removing the first abrasive grains from said lapping plate using said grain removing mechanism;

supplying second abrasive grains, whose grain size is different from that of the first abrasive grains, to said lapping plate; and lapping the work piece with the second abrasive grains.

2. The method of claim 1 wherein said moving member is connected to a supporting shaft, comprising the step of turning said moving member about said supporting shaft, whereby said moving member is capable of moving on said lapping plate with a circular track.

3. The method of claim 1 wherein said supporting shaft is located outside of an outer edge of said lapping plate.

4. The method of claim 1 wherein the lapping machine further has a control mechanism for adjusting a pressing force, comprising the additional step of pressing said moving member onto said lapping plate.

5. The method of claim 1 wherein the lapping machine further includes an adjusting mechanism for adjusting an angle between said moving member and the lapping face of said lapping plate.

6. The method of claim 1 wherein prior to said step of removing the first abrasive grains, the method further includes a step of washing said lapping plate with water for initial removal of said first abrasive grains from said lapping plate.

7. The method of claim 1 further comprising the steps of:

washing said lapping plate with water for initial removal of said second abrasive grains from said lapping plate; and removing the second abrasive grains from said lapping plate using said grain removing mechanism.

8. The method of claim 1 wherein said steps of lapping the work piece with said first abrasive grains and lapping the work piece with said second abrasive grains are automatically performed by said lapping machine.

9. The method of claim 1 wherein a position of said grain removing mechanism during said removing step is adjusted according to a displacement of said lapping plate caused by thermal deformation.

10. The method of claim 8 wherein the thermal deformation is detected by a thermos-sensor which reads the temperature of the lapping plate.

11. The method of claim 1 wherein the work piece is charged with minute electric current, and the amount of lapping of the work piece with the first abrasive grains and the second abrasive grains is controlled by detecting electric resistance of the work piece.

12. A method for lapping a work piece in a lapping machine having a lapping plate with a lapping face and a grain removing mechanism for removing abrasive grains from said lapping plate, said grain removing mechanism including a moving member having a wiping face which moves so as to remove the abrasive grains, said method comprising the steps of:

setting a work piece in position upon the lapping plate;

supplying first abrasive grains to said lapping plate and lapping the work piece with the first abrasive grains;

removing the first abrasive grains from said lapping plate using said grain removing mechanism;

supplying second abrasive grains, whose grain size is different from that of the first abrasive grains, to said lapping plate; and lapping the work piece with the second abrasive grains.

13. The method of claim 12 wherein said wiping face is of a curved-shaped extending in a longitudinal direction of said lapping plate.

14. The method of claim 12 wherein prior to said step of removing the first abrasive grains, the method further includes a step of washing said lapping plate with water for initial removal of said first abrasive grains from said lapping plate.

15. The method of claim 12 further comprising the steps of:

washing said lapping plate with water for initial removal of said second abrasive grains from said lapping plate; and removing the second abrasive grains from said lapping plate using said grain removing mechanism.

16. The method of claim 12 wherein said steps of lapping the work piece with said first abrasive grains and lapping the work piece with said second abrasive grains are automatically performed by said lapping machine.

17. The method of claim 12 wherein a position of said grain removing mechanism during said removing step is adjusted according to a displacement of said lapping plate caused by thermal deformation.

18. The method of claim 12 wherein the thermal deformation is detected by a thermos-sensor which reads the temperature of the lapping plate.

19. The method of claim 12 wherein the work piece is charged with minute electric current, and the amount of lapping of the work piece with the first abrasive grains and the second abrasive grains is controlled by detecting electric resistance of the work piece.

* * * * *